March 11, 1958    O. N. DENNY    2,826,100
ATTACHMENTS FOR CIRCULAR SAWS FOR SHARPENING AND
RECONDITIONING SAW BLADES THEREFOR
Filed Aug. 13, 1956    2 Sheets-Sheet 1

INVENTOR.
Otis N. Denny.
BY
Attorney

March 11, 1958  O. N. DENNY  2,826,100
ATTACHMENTS FOR CIRCULAR SAWS FOR SHARPENING AND
RECONDITIONING SAW BLADES THEREFOR
Filed Aug. 13, 1956  2 Sheets-Sheet 2
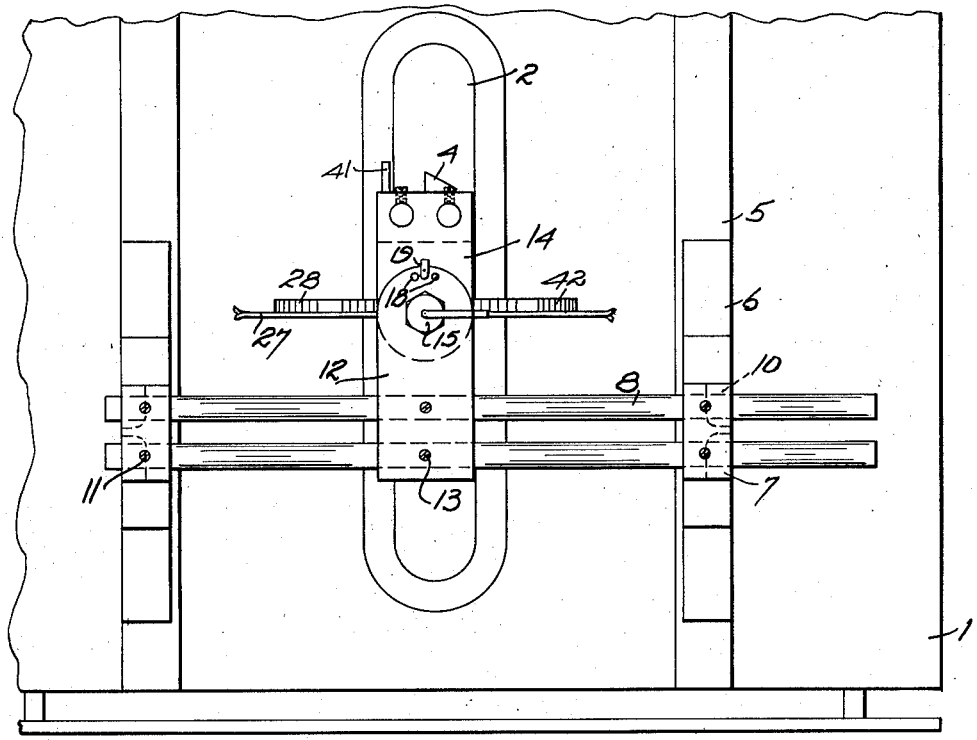
Fig. 3
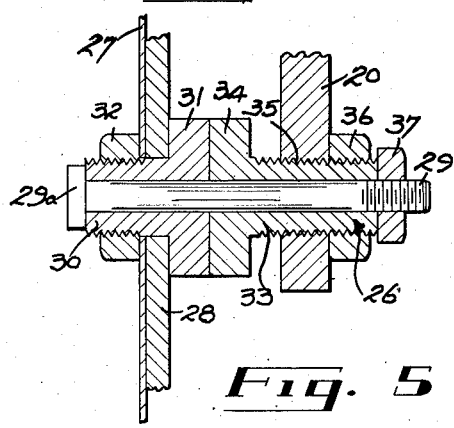
Fig. 4
Fig. 5
INVENTOR.
Otis N. Denny
BY
Attorney

United States Patent Office 2,826,100
Patented Mar. 11, 1958

2,826,100

ATTACHMENTS FOR CIRCULAR SAWS FOR SHARPENING AND RECONDITIONING SAW BLADES THEREFOR

Otis N. Denny, Southfield Township, Oakland County, Mich.

Application August 13, 1956, Serial No. 603,484

5 Claims. (Cl. 76—43)

This invention relates to an attachment for circular saws for sharpening and reconditioning saw blades therefor, and refers particularly to such an attachment which is adapted to be reciprocated upon the table of a saw and has means thereon for supporting a saw blade to be ground by a wheel mounted on the shaft on which the saw blade is normally secured.

It is an object of the invention to provide an attachment for circular saws on which saw blades may be mounted for sharpening and reconditioning which is adapted to be guided for reciprocation on the saw table by the conventional miter grooves formed therein irrespective of the spacing of the latter; and wherein a saw blade supporting arbor carried by the supports is mounted for adjustment both transversely of the table and pivotally about a vertical axis, and for vertical adjustment relative to the saw table.

Another object of the invention is to provide such an attachment whereon the saw blade is adapted to be held for sharpening against an indexing plate supported on the arbor, and wherein an index finger is adjustably carried by the arbor mounting so that it is adapted to engage peripheral notches formed in the indexing plate irrespective of the diameter of the latter to hold said plate and the saw blade against rotation.

A further object of the invention is to provide such an attachment which may be quite cheaply and easily produced and assembled, and with the aid of which great accuracy may be obtained.

With these and other objects and advantages in view which will become apparent as the specification proceeds, the invention is hereinafter more fully described with the aid of the accompanying drawings, in which:

Figure 3 is a plan view thereof.

Figure 4 is a partial plan similar to Figure 3 but showing the arm by which the saw blade is supported turned at an inclination to the bracket on which it is pivotally mounted, and Figure 5 is an enlarged sectional view of the blade supporting arbor.

Figure 1:
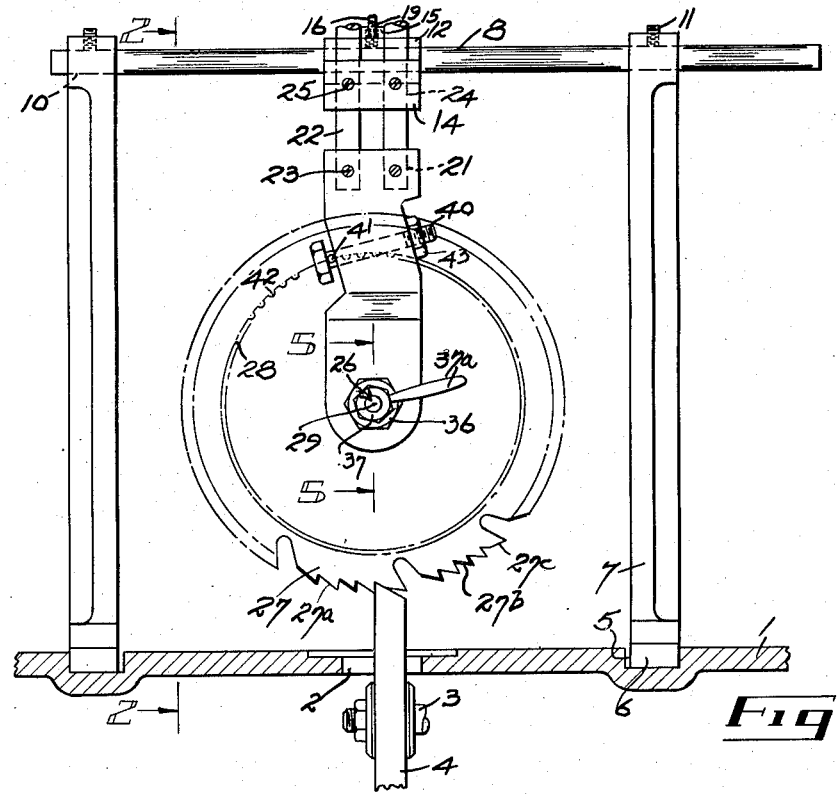
Figure 1 is a front elevation of the invention mounted for reciprocation on the table of a circular saw.

Referring first to a conventional circular saw to which my attachment is applied. In the drawings, 1 designates a saw table having a vertical slot 2 formed therethrough. Mounted for rotation beneath the table 1 in suitable bearings (not shown) is a spindle 3 which extends at right angles to the slot 2. This spindle normally has a saw blade secured thereon, but when my attachment is being used a grinding wheel 4, which projects upwardly through the slot 2, is fixed thereon in place of the blade. Formed also in the table 1 on opposite sides of the slot 2 and parallel therewith are miter grooves 5.

Mounted for reciprocation in each groove 5 is a shoe 6 on the lower extremity of a support 7; and secured to the supports and extending transversely between them are adjustable spacing means consisting in the present instance of parallel rods 8 the outer extremities of which project through openings 10 formed through the said supports. In threaded engagement with the supports 7 are screws 11 which engage the rods and retain the shoes 6 so spaced that their inner, or outer, sides are in sliding engagement with the inner, or outer, sides of the grooves 5. Thus provision is made for mounting the supports on tables having different spacings between their miter grooves 5.

Mounted for sliding adjustment along the rods 8 between the supports 7 is a bracket 12 which preferably extends at right angles to the said rods and is held at its adjusted position therealong as by screws 13. An arm 14 is pivotally secured to the bracket 12 by a vertical tubular fastening means 15 through which a vertically movable locating pin 16 projects. Formed in the arm 14 is a vertical opening 17, and extending through the bracket 12 are a plurality of vertical apertures 18 all equidistant from the axis of the screw 15 and the same distance from the latter as the axis of the opening 17. The apertures 18 are so positioned that when a locking pin 19 extends through one of them and engages the opening 17 the bracket 12 and arm 14 are in longitudinal alignment, and when the pin 19 extends through either of the other apertures 18 and is in registry with the opening 17 the arm is held at an inclination to the said bracket.

Formed vertically in the upper face of a mounting 20 are openings 21 to receive the lower extremities of rods 22 which are secured therein by screws 23 in threaded engagement with the said mounting. The upper extremities of the rods 22 project through vertical openings 24 formed through the arm 14, and threaded through the latter and terminating in the openings 24 are screws 25 by which the rods are held immovable relative to the arm. However by loosening the screws 25 the height of the mounting 20 may be vertically adjusted.

Supported by the mounting 20 is an arbor 26 on which a circular saw blade 27 to be ground is frictionally held against an indexing plate 28 thereon. The construction of the arbor is preferably as follows: A central bolt 29, having a head 29a at one extremity and threaded from its opposite extremity, has a bushing 30 mounted thereon the outer extremity of which bears against the head 29a and the inner extremity of the said bushing terminates in an annular flange 31 of increased diameter. Mounted around the bushing 30 and bearing against the outer face of the flange 31 is the indexing plate 28 against which the saw blade 27 is frictionally held by a nut 32 in threaded engagement with the outer peripheral portion of the bushing which is threaded for a short distance from its outer extremity. Mounted also on the bolt 29 is a second bushing 33 which is externally threaded throughout its length and terminates at its inner extremity in an annular flange 34 of increased diameter which is adapted to be tightened against the adjacent face of the flange 31. The bushing 33 is threaded through a tapped opening 35 formed through the mounting 20 and tightened against the latter and in threaded engagement with the bushing 33 is a lock nut 36. A nut 37 on the threaded extremity of the bolt 29 is normally tightened against the outer face of the bushing 33 to cause the latter to frictionally engage the bushing 30 by decreasing the spacing between the nut 37 and the bolt head 29a. Then the bushing 30 and the saw blade 27 and indexing plate 28 thereon are frictionally held against rotation. When it is desired to turn the bushing 30 to properly position another tooth of the saw blade for grinding the nut 37 is loosened and the bushing 30 may be freely rotated. It may also be noted that in order to facilitate the tightening and loosening of the nut 37 the latter is provided with a laterally projecting grip 37a.

Extending in a somewhat upwardly inclined direction through the mounting 20 at right angles to the axis of the arbor 26 is a bolt 40, and formed radially through the latter adjacent its head is an opening through which a resilient index finger 41 projects. Thus by rotary movement of the bolt 40 the finger may be set to project either horizontally or at an upward or downward inclination to engage a peripheral notch 42 in the indexing plate 28 irrespective of the diameter of the latter. A nut 43 on the outer extremity of the bolt 40, when tightened against the adjacent side of the mounting 20, holds the finger 41 in frictional engagement with the opposite side of the mounting. It is of course understood that the angular spacing between the notches 42 must correspond to that of the teeth in the saw blade to be ground, so that different indexing plates are needed for holding saw blades having differently spaced teeth.

Figure 2:
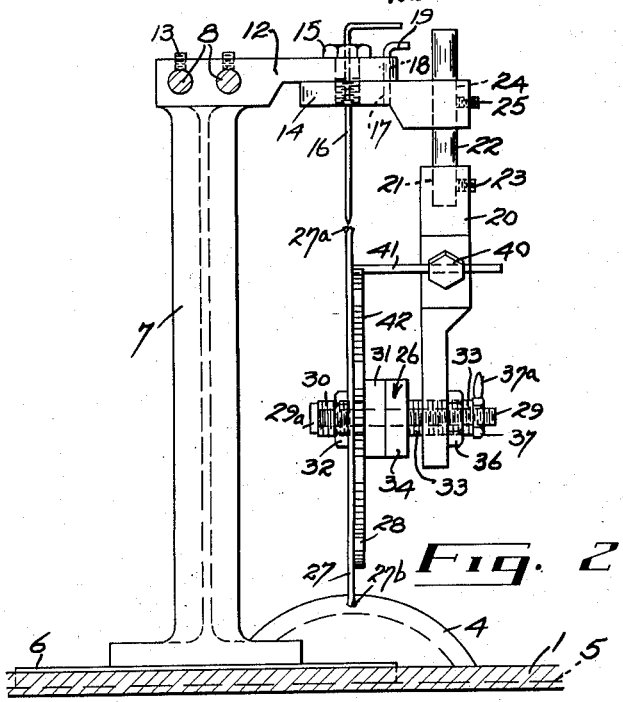
Figure 2 is a section on the line 2—2 of Figure 1.

When grinding a saw blade 27 the teeth 27a and 27b of which are alternately set in opposite directions as shown in Figures 1 and 2, all the teeth 27a are ground with the arm 14 pivoted in one direction at a slight inclination to the longitudinal axis of the bracket 12 as shown in Figure 4, and all the teeth 27b are ground with the arm pivoted at the same inclination but in the opposite direction relative to the said longitudinal axis. In order to obtain proper sharpening and reconditioning of the teeth of such saw blades the bracket must be so positioned along the rods 8 that the pivot axis about which the arm swings extends radially through the saw blade centrally of its width, and must also coincide with the face of the grinding wheel 4 which projects nearer to the root of the teeth. To facilitate this adjustment the pin 16 is provided which is axially slidable through the hollow fastening means 15. When the saw blade has raker teeth, as shown in Figure 1, it is possible in most saws to swing either the table 1 or the shaft 3, or both, about axes not shown, to bring the peripheral face of the grinding wheel 4 parallel with the faces 27c of the racker teeth to be ground.

While in the foregoing the preferred embodiment of the invention has been described and shown, it is understood that alterations and modifications may be made thereto provided they fall within the scope of the appended claims.

What I claim is:

1. An attachment for circular saws comprising two supports having means thereon for reciprocation in parallel miter grooves formed in the table of a circular saw, rods extending between the supports, each support being mounted for adjustment along one extremity of the rods whereby their spacing is adjustable, a bracket mounted for adjustment along the rods between the supports, an arm pivoted on the bracket for rotary adjustment about a vertical axis, said arm having vertical openings therethrough, a mounting, vertical rods projecting upwardly from the mounting for sliding adjustment through said openings, releasable means in engagement with the vertical rods for securing them relative to the arm, an arbor supported by the mounting and having means thereon for holding a circular saw for grinding by a wheel mounted on the shaft of the saw and projecting upwardly through a slot in the table parallel with and between the miter grooves.

2. The combination with a circular saw including a table having parallel miter grooves therein and a slot formed therethrough between and parallel with said grooves, and a rotary shaft having a grinding wheel secured thereon and projecting upwardly through the slot, of supports having shoes thereon mounted for reciprocation in the grooves, spacing means on opposite extremities of which the supports are mounted for adjustment therealong whereby said supports may be spaced to suit the spacing of the miter grooves, a bracket mounted for adjustment along the spacing means, an arm pivoted on the bracket about a vertical axis, said bracket being adapted to be so positioned that the axis of its vertical pivot is in alignment with one side of the grinding wheel, a mounting supported by the arm for vertical adjustment relative thereto, a horizontal arbor supported by the mounting, a rotary support on the arbor, an indexing plate thereon, means for holding a circular saw blade on the rotary support in frictional engagement with the indexing plate, releasable means on the arbor for holding the blade and plate against rotation thereon, and an index finger projecting from the mounting for successively engaging peripheral notches in the indexing plate as the latter is rotated.

3. The combination in claim 2, wherein adjustable means are interposed between the index finger and the mounting by adjustment of which the finger may be set to engage peripheral notches in plates of different diameters.

4. An attachment for circular saws including supports adapted to be mounted for reciprocation in parallel miter grooves formed in the table of a circular saw, spacing means extending transversely between the supports, a bracket mounted for adjustment along the spacing means, an arm pivoted on the bracket about a vertical axis, a mounting, means for supporting the mounting for vertical adjustment relative to the arm, a horizontal arbor supported by the mounting, and adjustable means on the arbor for holding a circular saw blade thereon so that the axis of the arm extends through the blade centrally of its width.

5. An attachment for circular saws comprising two supports having means thereon for reciprocation in parallel miter grooves formed in the table of a circular saw, rods extending between the supports, each support being mounted for adjustment along one extremity of the rods whereby their spacing is adjustable, a bracket mounted for adjustment along the rods between the supports, an arm pivoted on the bracket for rotary adjustment about a vertical axis, said arm having vertical openings therethrough, a mounting, vertical supports projecting upwardly from the mounting for sliding adjustment through said openings, releasable means in engagement with the vertical supports for securing them relative to the arm, a horizontal arbor supported by the mounting, said arbor being so positioned that in all rotary positions of the arm its axis intersects the axis of the arbor, and adjustable means on the arbor for holding a circular saw blade thereon so that the axis of the arm extends through the blade centrally of its width.

References Cited in the file of this patent

UNITED STATES PATENTS

| 2,436,004 | Hall | Feb. 17, 1948 |
| 2,646,697 | Phillips et al. | July 29, 1953 |